Sept. 26, 1950        R. M. BAUER        2,523,412
DOWNDRAFT FURNACE

Filed June 26, 1947        4 Sheets-Sheet 1

Inventor
Raymond Michael Bauer

By Clarence A. O'Brien
and Harvey B. Jacobson
Attorneys

Sept. 26, 1950 R. M. BAUER 2,523,412
DOWNDRAFT FURNACE
Filed June 26, 1947 4 Sheets-Sheet 2

Inventor
Raymond Michael Bauer

By Clarence A. O'Brien
and Harvey B. Jackson
Attorneys

Sept. 26, 1950         R. M. BAUER         2,523,412
DOWNDRAFT FURNACE

Filed June 26, 1947         4 Sheets-Sheet 3

Inventor
Raymond Michael Bauer

By *Clarence A. O'Brien*
*and Harvey B. Jacobson*
Attorneys

Sept. 26, 1950     R. M. BAUER     2,523,412
DOWNDRAFT FURNACE
Filed June 26, 1947                                              4 Sheets—Sheet 4
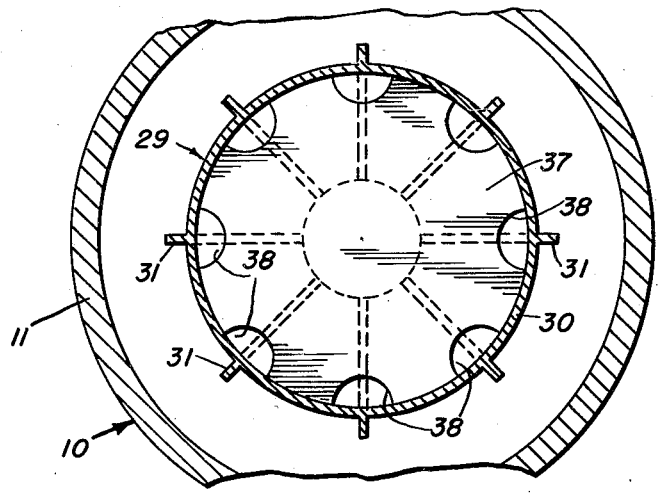
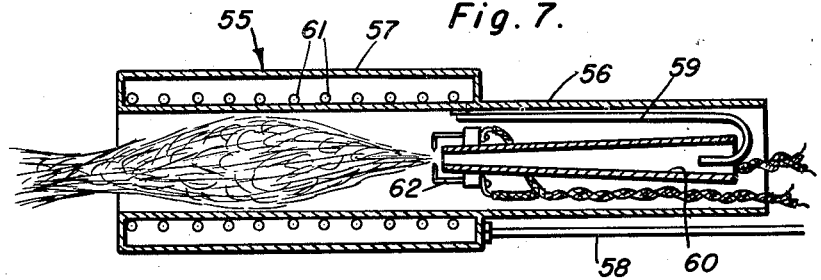
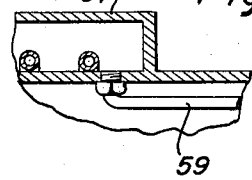
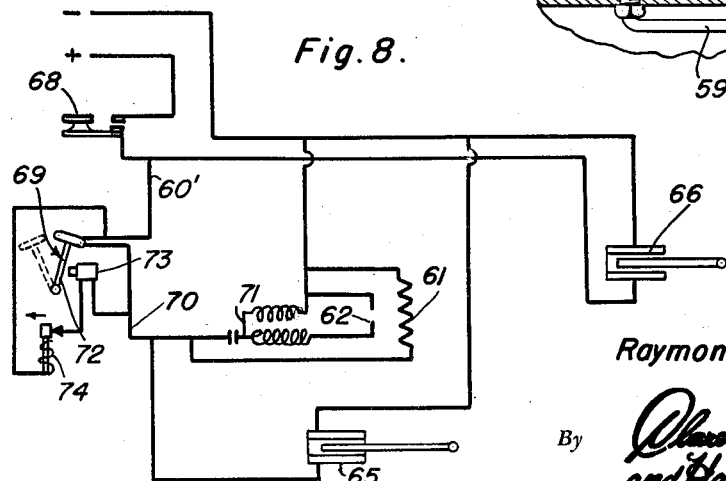
*Inventor*
Raymond Michael Bauer
By *Clarence A. O'Brien
and Harvey B. Jackson*
*Attorneys*

Patented Sept. 26, 1950

2,523,412

UNITED STATES PATENT OFFICE 2,523,412

DOWNDRAFT FURNACE

Raymond Michael Bauer, Indianapolis, Ind.

Application June 26, 1947, Serial No. 757,134

1 Claim. (Cl. 126—116)

This invention relates to a downdraft furnace and has for its primary object to improve the efficiency of heating plants, primarily of the type employed in domestic service.

Another object is to direct air into close contact with heated surfaces in order to extract the maximum amount of heat therefrom.

A further object is automatically to regulate the fuel input into the furnace and to insure the complete combustion of the fuel introduced thereinto.

The above and other objects may be obtained by employing this invention which embodies among its features a combustion chamber having a burner opening and a flue opening in its side wall, said combustion chamber also having an axial opening in its bottom wall, a series of heating drums beneath the combustion chamber communicating with one another and with the axial opening in the heating drum, the lowermost heating drum having a flue opening in its side wall, pipes coupling the flue openings with a stack and means automatically to close the flue opening in the combustion chamber when the latter attains a predetermined temperature.

Other features include a convolute passage in the lowermost heating drum through which the products of combustion must pass before their discharge into the flue opening, heating baffles in the heating drums to cause the products of combustion to flow therethrough adjacent the walls thereof, a casing enclosing the combustion chamber and the heating drums and baffles in the casing to cause fluid flowing therethrough to contact the surfaces of the heating drums.

In the drawings:

Figure 6 is a horizontal sectional view taken substantially along the line 6—6 of Figure 1;

Figure 7 is an enlarged sectional view through a gaseous fuel burner suitable for use in connection with this furnace; and, Figure 8 is a diagrammatic view of the control system for the burner.

Figure 9 is an enlarged fragmentary sectional view showing the manner of coupling the vapor distributing pipe to the jacket surrounding the burner tube, illustrated in Figure 7.

Figure 1:
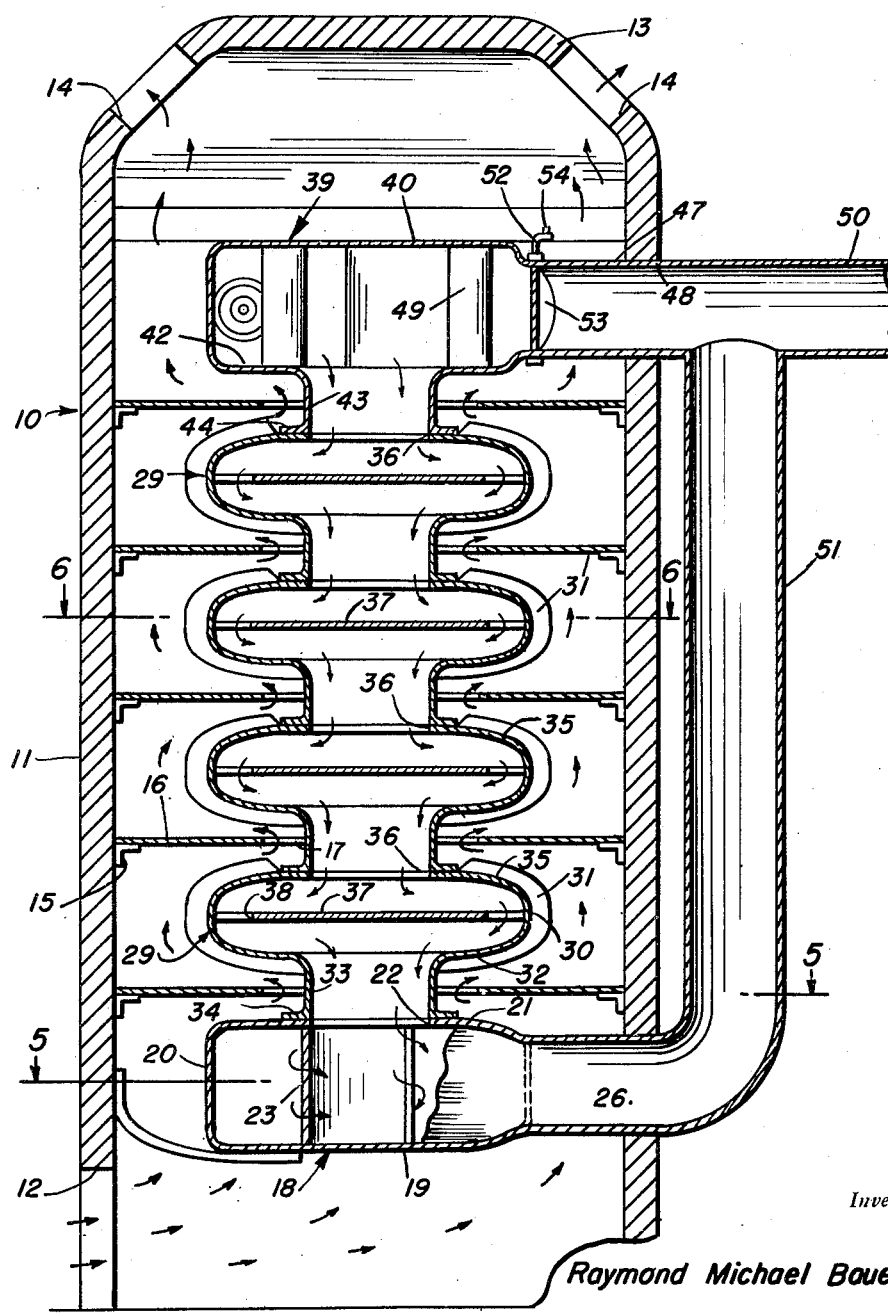
Figure 1 is a vertical sectional view through a furnace embodying features of this invention.
Figure 2:
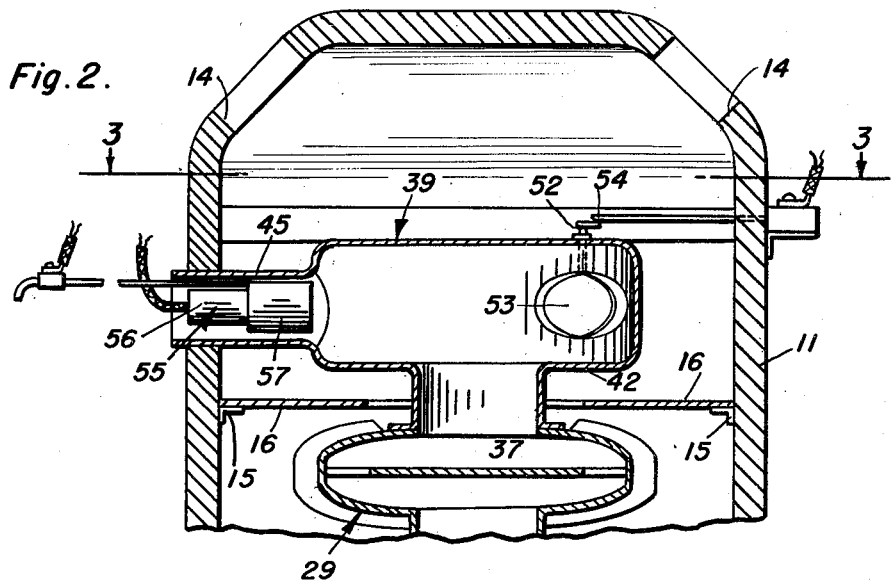
Figure 2 is a fragmentary vertical sectional view similar to Figure 1 but taken in a plane perpendicular thereto.

Referring to the drawings in detail this improved furnace designated generally 10 comprises an outer casing 11 having adjacent its lower end one or more air inlet openings 12 through which cool air is introduced into the casing. The upper end of the casing is closed by a bonnet 13 having air outlet openings 14 which are adapted to be coupled to the warm air distributing system of the heating plant in a conventional manner. The casing 11 is preferably insulated with a suitable non-conducting substance, and provided at vertically spaced intervals within the casing are horizontal rows of supporting brackets 15 upon which baffle rings 16 are supported. These baffle rings are provided with axially aligned axial openings 17 through which communication is established between the upper and lower ends of the furnace casing 11.

Figure 5:
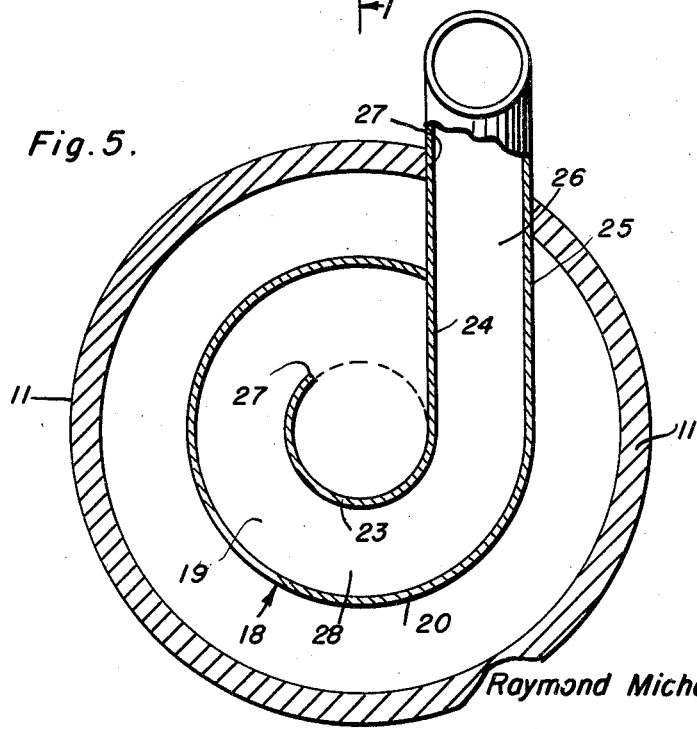
Figure 5 is a horizontal sectional view taken substantially along the line 5—5 of Figure 1.

Supported in any suitable manner within the casing 11 is a bottom heating drum designated generally 18 which comprises a circular bottom wall 19 from the peripheral edge of which rises a circular side wall 20. A top wall 21 is supported on the upper edge of the side wall 20 and is provided with an axial opening 22 for a purpose to be more fully hereinafter described. Extending from the bottom to the top wall within the interior of the drum 18 is a circular wall 23, the radius of which corresponds to the radius of the opening 22, and extending tangentially from the wall 23 to the drum 20 is a wall 24 which together with a tangential wall 25 leading from the wall 20 forms a flue passage 26 which leads outwardly through an opening 27 in the casing 11. As illustrated in Figure 5 the wall 23 terminates at 27. It will thus be seen that a substantially volute shaped flue passage 28 is formed within the drum 18 which establishes communication between the opening 22 and the flue passage 26.

Supported on the top wall 21 of the bottom or lowermost heating drum 18 is a series of heating drums each designated generally 29. Each heating drum 29 comprises a substantially circular side wall 30 carrying on its exterior heat radiating fins 31. A bottom wall 32 is formed at the lower end of the cylindrical side wall 30 and formed integral with the bottom wall and depending therefrom is a tubular collar 33 having a flange 34 at its lower end which is adapted to rest on the top wall of the heating drum immediately therebelow. The collar 33 is arranged concentrically at the edge of the heat inlet opening in the top wall of the drum immediately below so as to establish communication between the interior of the drum 29 and the one immediately below it. Formed at the upper edge of the wall 30 of the heating drum 29 is a top wall 35 having an axial opening 36 therein which is adapted to align with the collar of the drum resting on the top wall 35. It will thus be seen that as many heating drums as may be desired may be superimposed upon the bottom heating drum 18 to assure complete extraction of the heat from the heated gases passing therethrough. Extending transversely through each heating drum is a baffle plate 37 provided at its periphery with an annular row of radially spaced recesses or openings 38 so that the heated gases and products of combustion passing through the drum will be directed against the side and ends thereof.

Resting on the uppermost heating drum 29 is a combustion chamber designated generally 39. This combustion chamber comprises a top wall 40 provided at its peripheral edge with a depending circular wall 41, the lower edge of which joins a bottom wall 42 having an axial opening therethrough which is surrounded by a depending collar 43 carrying at its lower edge a flange 44 which is adapted to rest on the top wall 35 of the heating drum 29 immediately below the combustion chamber. Extending tangentially from and communicating with the interior of the heating drum 39 is a burner tube 45 which extends through an opening 46 in the casing 11, and extending tangentially from the heating drum 39 is a tubular flue 47 which extends through an opening 48 in the casing 11, the axis of which lies perpendicular to the axis of the opening 46. Suitable baffles 49 are disposed at spaced intervals within the combustion chamber and extend between the walls 40 and 42 thereof in spaced relation to the side wall 41. The flue 47 is coupled to a suitable pipe 50 which leads to a suitable stack (not shown), and coupled into the pipe 50 near the flue 47 is a branch pipe 51 which in turn is connected to the flue 26 of the bottom heating drum. Mounted on a suitable control shaft 52 which extends transversely of the flue 47 at its junction with the combustion chamber 39 is a gate or damper 53 which in one position is adapted to close the flue passage 47, and in another position is adapted to establish communication between the flue passage and the combustion chamber. One end of the shaft 52 is provided with a crank pin 54 by means of which the movements of the shaft 52 may be governed to open or close the gate or damper 53.

Figure 4:
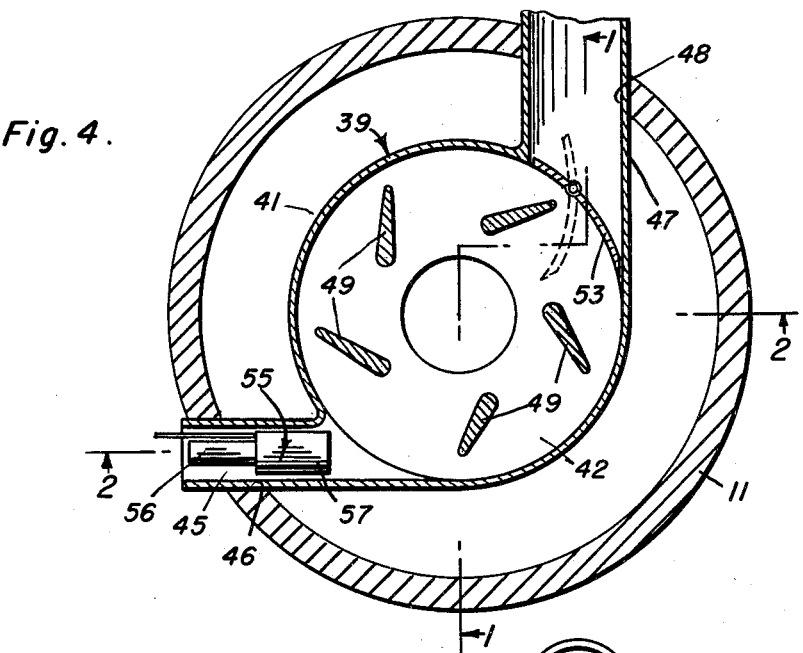
Figure 4 is a horizontal sectional view through the furnace and combustion chamber.

Entering the burner tube 45 is a burner designated generally 55 which as illustrated in Figure 7 comprises a burner tube 56 surrounded for about one-half of its length with a tubular jacket 57 which is coupled through the medium of a fuel supply pipe 58 with a suitable source liquid fuel such as fuel oil. A vapor distributing pipe 59 is also coupled with the chamber formed by the jacket 57 and leads into a mixing chamber 60 mounted within the burner tube 56. A suitable electric heating coil 61 surrounds the burner tube 56 within the jacket 57 in order to provide a preliminary heating means by which the fuel oil sent thereto through the pipe 58 may be vaporized to be discharged through the pipe 59 into the mixing chamber 60. A suitable spark igniter 62 of conventional form is fixed adjacent the end of the burner tube to which the vaporized fuel and air mixture is discharged in order that the mixture may be initially ignited by an electrical discharge across the points of the igniter 62. As illustrated the mixing chamber 60 is located in the burner tube 56 so that the ignited fuel will serve to heat the contents of the chamber formed by the jacket 57 once the burner has been started so that the electric heating means 61 may be cut out during the normal operation of the burner. As illustrated in Figure 4 the burner 55 is introduced into the burner tube 45 so that the flame of the burning fuel will be directed into the combustion chamber 39.

Figure 3:
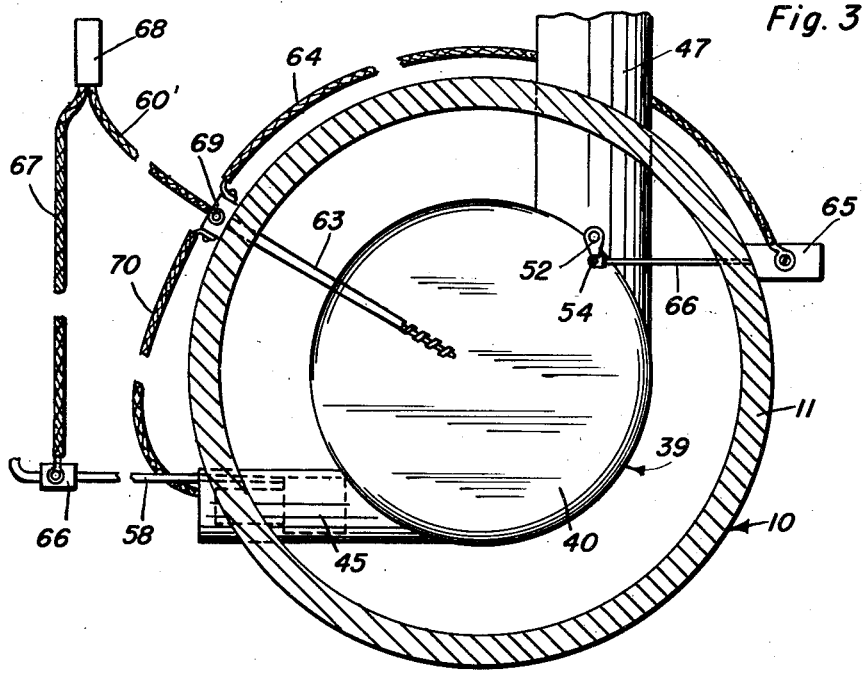
Figure 3 is a horizontal sectional view taken substantially along the line 3—3 of Figure 2.

In order that the damper or gate 53 may be automatically closed when the combustion chamber 39 attains a predetermined temperature I employ a conventional bonnet control 63 (Fig. 3) which is coupled through a cable 64 to a conventional electro-magnetic control device 65 such as a solenoid, the armature of which is coupled by means of a connecting rod 66 with the crank pin 54. This electro-magnetic control device 65 is so arranged that when the circuit is broken therethrough by the actuation of the bonnet control 63 the damper 53 will be moved to closed position. The operation of an oil valve 66 coupled to the fuel supply pipe 58 of the burner 55 is regulated by electro-magnetic means coupled through a cable 67 which leads to a thermostatic control 68 arranged in the space to be heated. The thermostatic control is so arranged as to open the valve 66 when the temperature in the space to be heated drops to or below a predetermined value. A cable 68' also leads from the thermostatic control 68 through a master control box 69 and a cable 70 to the igniter 62 so that when the oil valve 66 is open, the igniter will be set into operation. The master control 69 is of conventional design and includes a circuit having the customary thermostat elements, a bi-metallic thermostat or electrically heated warp bar 74, a solenoid 73 and a mercury switch 72, the latter being opened by heating of the warp bar to break the circuit, as seen in dotted line position in Figure 8, and being closed by the solenoid. An ignition coil 71 is wired in the circuit with the spark gap igniter 62. Also connected in the igniter circuit to be governed by the closing thereof is the heating coil 61 which as previously described serves to vaporize the fuel flowing through the pipe 58 before it enters the pipe 59.

In use it will be understood that with the burner 55 in operation, the flame and products of combustion thereof will be directed into the combustion chamber 39, and during the initial stages of the operation the damper or gate 53 will remain open so that the products of combustion may pass directly through the flue 47 into the pipe 50 and to the stack. When the combustion chamber 39 has attained a predetermined temperature the bonnet control 63 operates to break the circuit through the electro-magnetic device 65 so as to allow the damper or gate 53 to move to closed position. As soon as this has been accomplished the products of combustion are directed downwardly through the collar 43 and into the heating drums 29 beneath the combustion chamber 39 and into the heating drum 18 in the bottom of the furnace from which they pass outwardly through the flue 26 and pipe 51 to the pipe 50 and thence to the stack. The baffles 37 will serve to cause the heated gases and products of combustion closely to follow the walls of the heating drums and the baffles 16 will cause the air flowing upwardly through the jacket 11 to follow closely the contour of the exterior of each drum 29, thus effecting a rapid and efficient heating of the air before it is discharged through the openings 14 to be distributed into the space to be heated. Owing to the fact that the air contacts the most highly heated portion of the furnace immediately prior to its discharge through the distributing opening 14 it will be evident that it is in the best condition to accomplish the desired purpose.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a downdraft furnace, a cylindrical combustion chamber having a tangential burner opening and a tangential flue opening in its side walls, whereby combustion gases entering the chamber from the burner are whirled therein and withdrawn tangentially in the direction of whirling through the flue opening, an automatically controlled damper in said flue opening, said combustion chamber also having an axial opening in its bottom, a series of interconnected axially aligned and communicated drums connected to the axial opening, a heating drum connected to the lowermost drum in the series and communicating therethrough with the combustion chamber, the combustion gases being whirled through the drums into the heating drum upon closing of the damper, said heating drum having a flue opening in its side, pipes coupling the flue openings with a stack, and said heating drum having a wall defining a convolute passage therein through which the combustion gases must pass before their discharge through the flue opening.

RAYMOND MICHAEL BAUER.

REFERENCES CITED

The following references are of record in the file of this patent:

UNITED STATES PATENTS

| Number | Name | Date |
|---|---|---|
| 1,561,161 | Ionides | Nov. 10, 1925 |
| 1,743,177 | Winter | Jan. 14, 1930 |
| 2,254,481 | Harris | Sept. 2, 1941 |